United States Patent
Kramb

[11] 4,008,215
[45] Feb. 15, 1977

[54] SULFONIC-ACID SUBSTITUTED DISAZO DYESTUFFS

[75] Inventor: Hans Kramb, San Cugat del Valles, Spain

[73] Assignee: Bayer Aktiengesellschaft, Leverkusen, Germany

[22] Filed: Oct. 9, 1974

[21] Appl. No.: 513,240

[30] Foreign Application Priority Data

Oct. 12, 1973  Germany .......................... 2351293

[52] U.S. Cl. .............................. 260/183; 260/180; 260/182; 260/184; 260/186
[51] Int. Cl.² .................. C09B 35/08; C09B 33/02; C09B 31/02; D06P 3/06
[58] Field of Search .......... 260/183, 182, 174, 180, 260/184, 186

[56] References Cited
UNITED STATES PATENTS

| | | | |
|---|---|---|---|
| 521,095 | 6/1894 | Bernthsen et al. | 260/183 |
| 534,573 | 2/1895 | Paganini | 260/183 |
| 1,071,832 | 9/1913 | Wagner et al. | 260/182 |
| 1,071,833 | 9/1913 | Wagner et al. | 260/182 |
| 1,904,821 | 4/1933 | Brightman | 260/183 X |
| 2,021,917 | 11/1935 | Mendoza | 260/183 X |

OTHER PUBLICATIONS

*Colour Index*, Third Edition, vol. 4, 1971, p. 4186 (23,255 and 23,260).

*Colour Index*, Third Edition, vol. 4, 1971, p. 4187 (23,280), p. 4194 (23,685) and p. 4195 (23,720).
*Colour Index*, Third Edition, vol. 4, 1971, p. 4195 (23,715).

*Primary Examiner*—Daniel E. Wyman
*Assistant Examiner*—John J. Doll
*Attorney, Agent, or Firm*—Plumley and Tyner

[57] ABSTRACT

Dyestuffs of the formula:

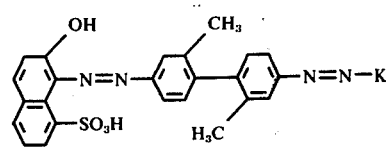

are described, wherein K denotes the radical of a coupling component KH which can belong to the benzene, naphthalene or heterocyclic series. The dyestuffs are prepared by one-sided coupling of tetrazotized 4,4'-diamino-2,2'-dimethyldiphenyl with 2-hydroxynaphthalene-8-sulphonic acid in an alkaline medium, and reaction of the intermediate stage with the coupling component KH. The dyestuffs are useful for dyeing natural and synthetic, especially nitrogen containing fibre, materials such as wool and polyamides, including poly-ε-caprolactam or condensation products of adipic acid and hexamethylene diamine.

1 Claim, No Drawings

SULFONIC-ACID SUBSTITUTED DISAZO DYESTUFFS

The invention relates to disazo dyestuffs which in the form of the free acid correspond to the general formula

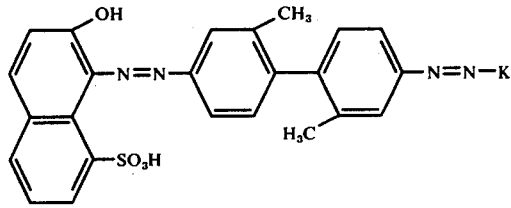

wherein

K represents the radical of a coupling component, their preparation and their use.

The coupling components KH can belong to the benzene, naphthalene or heterocyclic series.

Preferred coupling components KH are hydroxynaphthalenesulphonic acids, especially hydroxynaphthalenemonosulphonic acids, such as 2-hydroxynaphthalene-8-sulphonic acid, 1-hydroxynaphthalene-3-sulphonic acid, 1-hydroxynaphthalene-4-sulphonic acid, 1-hydroxynaphthalene-5-sulphonic acid and 2-amino-8-hydroxynaphthalene-6-sulphonic acid.

The new dyestuffs are obtained by one-sided coupling of tetraazotised 4,4'-diamino-2,2'-dimethyldiphenyl with 2-hydroxynaphthalene-8-sulphonic acid in an alkaline medium, and reaction of the intermediate stage with a coupling component KH.

The second coupling can be carried out either under alkaline conditions or, when using aminonaphtholsulphonic acids as the coupling component KH, also under acid conditions.

The new dyestuffs of the formula (I) are suitable for dyeing natural and synthetic, especially nitrogen-containing, fibre materials, for example polyamides, such as poly-ε-caprolactam or condensation products of adipic acid and hexamethylenediamine, and wool.

The dyeings of the dyestuffs (I) on polyamide in general show good fastness to light and good to very good fastness to water, washing and perspiration.

The dyestuffs (I) can be employed in the form of the free acids of their salts, especially in the form of the alkali metal salts, particularly the sodium salts, or of the ammonium salts.

EXAMPLE 1

21.2 g of 4,4'-diamino-2,2'-dimethyldiphenyl are stirred with 300 ml of water and tetraazotised with 34 ml of hydrochloric acid of 19° Be. strength and 13.8 g of sodium nitrite at 0°–5° C. The excess nitrite is eliminated with amidosulphonic acid. The pH is adjusted to 4–4.5 with 35–40 cm³ of 20% strength sodium carbonate solution.

This tetraazotisation mixture is added over the course of 30 minutes to a solution of 24.2 g of 2-hydroxynaphthalene-8-sulphonic acid and 26 g of sodium carbonate in 700 ml of water at 0°–5° C. After approx. 2–3 hours, the one-sided coupling is complete. The intermediate stage has largely precipitated.

The reaction mixture is added to an aqueous solution of 23.5 g of 1-hydroxynaphthalene-4-sulphonic acid and 35 g of sodium carbonate in 500 ml of water. The temperature is about 10° C and the pH is 8.5. After 16 hours, the mixture is heated to 80° C, and filtered.

The dyestuff thus obtained dyes polyamide in brilliant, yellowish-tinged red shades. These dyeings exhibit good fastness to water and very good fastness to washing.

If instead of 1-hydroxynaphthalene-4-sulphonic acid the same amount of 1-hydroxynaphthalene-3-sulphonic acid or 1-hydroxynaphthalene-5-sulphonic acid is used, the same process gives dyestuffs which are very similar in colour shade and in their fastness properties to the dyestuff prepared using 1-hydroxynaphthalene-4-sulphonic acid.

EXAMPLE 2

The intermediate product prepared according to Example 1, first and second paragraph, is adjusted to pH 2.5 with 40 ml of hydrochloric acid (19° Be).

A neutral solution is prepared from 25.1 g of 2-amino-8-hydroxynaphthalene-6-sulphonic acid. This solution is added to a mixture of 25 ml of hydrochloric acid of 19.5° Be. strength, water and ice, whereupon 2-amino-8-hydroxynaphthalene-6-sulphonic acid precipitates in a finely granular form. The pH is 2.5–3 and the temperature is 0°–5° C.

Thereafter, the intermediate product, which has been acidified, is added and 150 ml of 20% strength sodium acetate solution at 60° C are then allowed to run in. As a result, the coupling mixture assumes a pH of 4.5 and a temperature of 18° C. After 16–24 hours, the coupling reaction is complete. The mixture is then heated to 80° C, 70 ml of sodium hydroxide solution of 40° Be. strength (pH 10.5) are added, and the dyestuff is precipitated by adding sodium chloride.

The dyestuff dyes wool and polyamide in yellowish-tinged red shades. The dyeings on polyamide exhibit good fastness to light and very good fastness to water, washing and perspiration. Equally, the fastness to solvents and the fastness to thermofixing are very good. The dyestuff is suitable for the production of deep colour shades.

EXAMPLE 3

21.2 g of tetraazotised 4,4'-diamino-2,2'-dimethyldiphenyl are added over the course of ½ hour to an aqueous solution of 49.3 g of 2-hydroxynaphthalene-8-sulphonic acid and 60 g of sodium carbonate at 0°–5° C and pH 8.5. The coupling is complete after 12–16 hours. To isolate the dyestuff, the mixture is heated to 80° C and filtered at this temperature.

The dyestuff dyes polyamide in a reddish-tinged orange and is suitable for the production of deep colour shades.

The fastness to water, washing and perspiration is very good, as is the fastness to solvents and to thermofixing.

I claim:

1. Disazo dyestuff, which in the form of the free acid corresponds to the formula

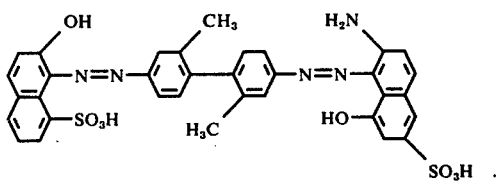

* * * * *